United States Patent [19]

Furuto

[11] 4,085,640
[45] Apr. 25, 1978

[54] APPARATUS FOR SHEARING WIRE, ROD, OR THE LIKE

[75] Inventor: Takashi Furuto, Komatsu, Japan

[73] Assignee: Kabushiki Kaisha Komatsu Seisakusho, Tokyo, Japan

[21] Appl. No.: 779,564

[22] Filed: Mar. 21, 1977

[30] Foreign Application Priority Data

Mar. 19, 1976 Japan .................................. 51-29308

[51] Int. Cl.² .............................................. B26D 3/16
[52] U.S. Cl. ....................................... 83/198; 83/616; 10/25; 83/580
[58] Field of Search ................. 83/198, 196, 580, 616, 83/617; 10/25

[56] References Cited

U.S. PATENT DOCUMENTS 2,730,731 1/1956 Schaeffer ................................. 83/616
3,886,829 6/1975 Criblez ................................... 83/198

Primary Examiner—Donald R. Schran
Attorney, Agent, or Firm—Armstrong, Nikaido, Marmelstein & Kubovcik

[57] ABSTRACT

Incorporated with a heading machine for cutting continuous wire stock into required lengths for subsequent heading operation, the shearing apparatus includes a movable shear element against which is clamped a wire length to be cut off and which is reciprocated with respect to a fixed shear element. For reciprocating the movable shear element, which is carried by a slide, there is provided an actuator lever having a pusher member operatively mounted on its free end. The pusher member pushes the slide via an abutment thereon during the forward or cutting stroke of the movable shear element and, during the return stroke, via an air cylinder secured to the slide and held under constant supply of pressurized air. Upon completion of the return stroke, the air cylinder retracts to permit the actuator lever to pivot through an additional angle, with the consequent creation of a space between pusher member and abutment, so that the actuator lever can be pivoted back unloaded through the additional angle before commencing the forward stroke of the movable shear element.

6 Claims, 5 Drawing Figures

APPARATUS FOR SHEARING WIRE, ROD, OR THE LIKE

BACKGROUND OF THE INVENTION

1. Field of the Invention

This invention relates to cutting or shearing apparatus, and in particular to apparatus for shearing wire, rod, or like elongate work into desired lengths. The shearing apparatus in accordance with this invention is contemplated for use preferably with or in a header or machine which forms the heads of rivets, bolt blanks, screw blanks, and similar products, by upsetting the ends of the wire lengths, but with no unnecessary limitations thereto being intended.

2. Description of the Prior Art

The shearing apparatus of the type under consideration usually comprises a fixed shear element for holding wire or other work in such a way that a desired length of the wire projects therefrom, and a movable shear element against which is clamped the projecting wire length and which travels away from the fixed shear element for cutting off the wire length. Thus, since the stock is sheared immediately when the movable shear elements starts travelling away from the fixed shear element, the cutting speed has in most cases been insufficient, resulting in the irregularity at the ends of the wire lengths produced. The wire lengths with such irregular ends are objectionable because they render the quality of the end products noticeably inferior.

SUMMARY OF THE INVENTION

It is therefore an object of this invention to provide improvements in shearing apparatus of the type specified whereby irregularity at the ends of lengths of wire or other work produced by shearing is minimized.

With this and other objects in view, the present invention provides, in shearing apparatus of the type having a movable and a fixed shear element, the combination including a slide carrying the movable shear element and slidable along a predetermined path between a first and a second position. For reciprocating the slide between the first and the second positions, there is provided actuator means which moves the slide from the first to the second position by abutting against an abutment on the slide, and which moves the slide from the second back to the first position through resilient means mounted thereon. The resilient means yields, when the slide is stopped in the first position, to permit the actuator means to move an additional distance in a direction away from the second position, so that a space is created between the actuator means and the abutment on the slide. The actuator means is therefore allowed to travel unloaded back through the space before moving the slide, and hence the movable shear element, from the first to the second position.

In one embodiment of the invention, in which the shearing apparatus is incorporated with or in a heading machine, the actuator means comprises an actuator lever which is pivoted back and forth as by a cam mechanism, and a pusher member operatively mounted on the free end of the actuator lever. The resilient means takes the form of an air cylinder whose head end chamber is maintained under constant supply of pressurized air during operation of the apparatus.

Thus, during the movement of the slide from the first to the second position on the cutting stroke of the movable shear element, the pusher member pushes the slide via the abutment thereon. During the return stroke of the movable shear element, the pusher member pushes the slide via the piston rod of the air cylinder, which is then held extended. Upon completion of the return stroke, the actuator lever is pivoted through an additional angle in such a direction that the piston rod of the cylinder is retracted by the pusher member against the air pressure in its head end chamber, with the consequent creation of the space between pusher member and abutment.

Before moving the slide from the first to the second position, therefore, the actuator lever can be pivoted back unloaded through the said additional angle. It is possible in this manner to cause the movable shear element to start travelling on its cutting stroke at much higher speed than has been possible heretofore, and hence to minimize irregularity at the ends of the wire lengths or the like produced.

The above and other objects, features and advantages of this invention and the manner of attaining them will become more apparent, and the invention itself will best be understood, upon consideration of the following description taken together with the accompanying drawings showing a preferred embodiment of the invention.

DESCRIPTION OF THE PREFERRED EMBODIMENT

Figure 1:
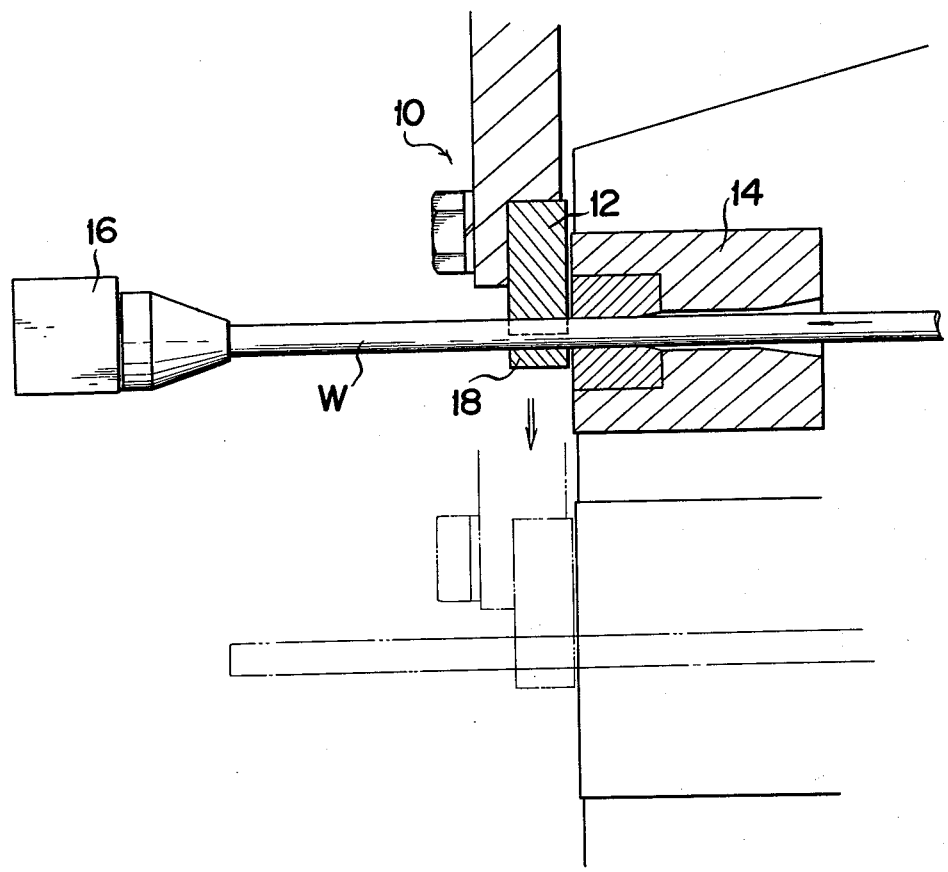
FIG. 1 is a partial, horizontal sectional view schematically illustrating the shearing apparatus of this invention as adapted for use in a heading machine.

In one adaptation of this invention illustrated schematically in FIG. 1, the shearing apparatus in accordance with the invention is generally designated 10 and is shown incorporated in or with a heading machine. The shearing apparatus includes a movable shear element 12 which is reciprocated, with respect to a fixed shear element 14, between a first or cutting position indicated by the solid lines and a second or transfer position indicated by the dot-and-dash lines.

Continuous wire stock W to be sheared and headed is fed as indicated by the arrow into and through the fixed shear element 14, until the wire makes abutting engagement with a stop mechanism 16. Thus, the length of wire to be cut off projects outwardly of the fixed shear element 14.

Seen at 18 is a clamp mechanism for clamping the projecting wire length against the movable shear element 12 when the latter is in the cutting position. This clamp mechanism is movable with the movable shear element 12 between the cutting and the transfer positions. As the movable shear element 12 travels with the clamp mechanism 18 from the cutting toward the transfer position, therefore, the wire length which has been projecting out of the fixed shear element 14 is cut off by shearing action. The severed wire elngth is subsequently transported, while being held clamped, to the transfer position, where the wire length is unclamped and transferred to, for example, the first of several successive heading stations.

The clamp mechanism 18 suitable for use with the shearing apparatus 10 is described and claimed in T. Furuto copending U.S. patent application Ser. No. 751,728, filed on Dec. 17, 1976 and assigned to the instant assignee. The present invention is specifically directed to means for reciprocating the movable shear element 12 together with the clamp mechanism 18 between the cutting and the transfer positions, as hereinafter described with reference to FIGS. 2 through 5.

Figure 2:
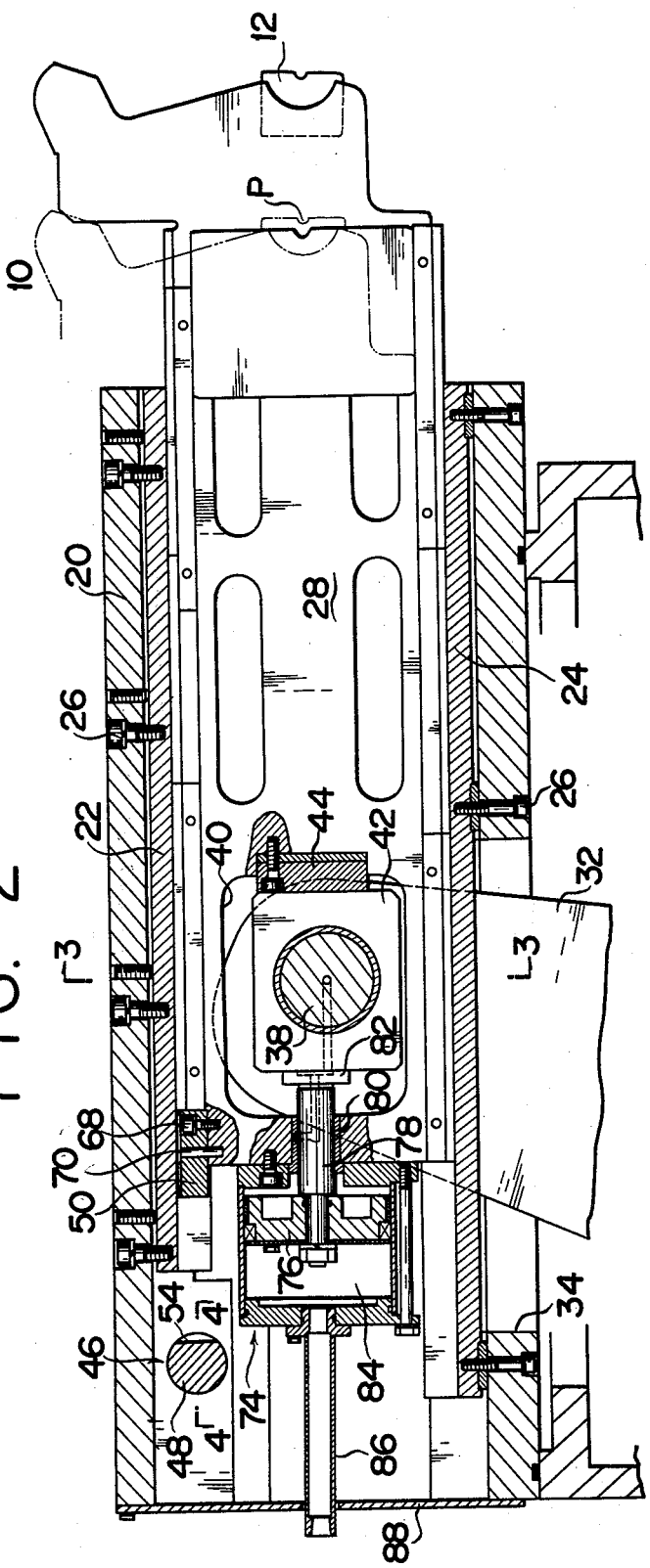
FIG. 2 is a vertical sectional view of a mechanism for reciprocating the movable shear element of the shearing apparatus in accordance with the invention.
Figure 3:
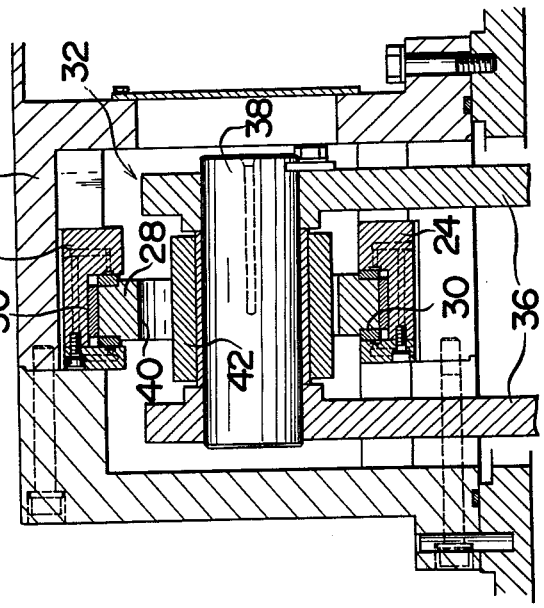
FIG. 3 is a vertical sectional view taken along the line 3—3 of FIG. 2.

As will be seen from FIGS. 2 and 3, the shearing apparatus 10 in accordance with this invention includes a frame 20 of hollow, rectangular cross sectional shape. Within the frame 10, top and bottom grooved guide members 22 and 24 are fixedly mounted, as by use of capscrews 26, in parallel spaced and vertically registered relationship. These grooved guide members coact to provide a linear slideway for a slide 28 carrying the aforesaid movable shear element 12 at its front end.

The slide 28 has its top and bottom edges slidably engaged in the opposed grooves of the guide members 22 and 24, respectively, via facings 30 of wear resisting material. This slide is to be reciprocated, by means hereinafter set forth, along the guide members 22 and 24 for moving the movable shear element 12 between the cutting and the transfer positions.

For imparting such reciprocating motion to the slide 28, there is provided a bifurcated actuator lever 32 extending upwardly into the frame 20 through an opening 34 formed in its bottom. As will be seen from FIG. 3, the pair of constituent parts 36 of the bifurcated actuator lever 32 are disposed on opposite sides of the slide 28 and are rigidly interconnected at their top or free ends by a pin 38 extending through a relatively large, transverse opening 40 formed in the slide at or adjacent its rear end.

Rotatably mounted on the pin 38 is a pusher member 42 of rectangular cross section which is very loosely received in the slide opening 40. An abutment 44 disposed forwardly of the pusher member 42 is screwed or otherwise fastened to the slide 28. Thus, as the actuator lever 32 is pivoted clockwise, as viewed in FIG. 2, as by a cam mechanism (not shown), the pusher member 42 is urged against the abutment 44 to thrust the slide 28 forwardly therethrough and hence to move the movable shear element 12 from the cutting to the transfer position.

Figure 5:
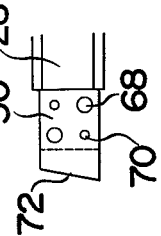
FIG. 5 is a top plan view of a contact member which, together with the means of FIG. 4, constitutes an adjustable stop mechanism included in the shearing apparatus.
Figure 4:
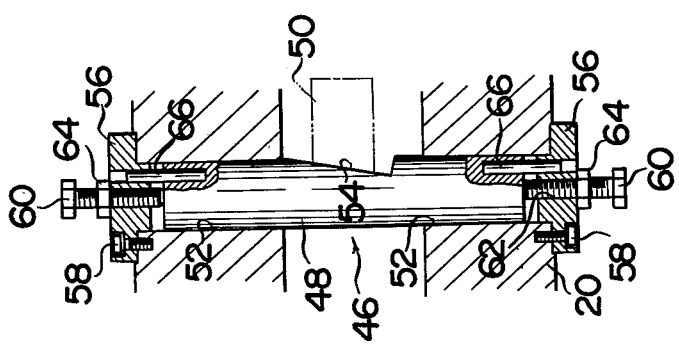
FIG. 4 is a horizontal sectional view taken along the line 4—4 of FIG. 2.

As shown in FIG. 2 and in greater detail in FIGS. 4 and 5, there is provided an adjustable stop mechanism 46 for limiting the rearward travel of the slide 28 in the cutting position of the movable shear element 12 thereon. Broadly, the adjustable stop mechanism 46 comprises an elongate stop member 48 slidably supported by the frame 20 and extending horizontally in a direction at right angles with the direction of the reciprocating motion of the slide 28, and a contact member 50 fixedly mounted on the slide at its rear end for movement into and out of direct abutting contact with the stop member.

With particular reference to FIG. 4, the stop member 48 has its opposite end portions slidably received in a pair of aligned holes 52 formed in the frame 20. The stop member 48 has a sloping stop surface 54 formed in its mid-portion so as to be directed toward the contact member 50 on the rear end of the slide 28. The pair of aligned holes 52 in the frame 20 are closed at their outer ends by a pair of flanged plugs or closure members 56 which are shown to be screwed at 58 to the frame.

For adjustably moving the stop member 48 endwise relative to the frame 20, there are provided a pair of adjusting screws or bolts 60 which are inserted into and through tapped holes 62 formed in the pair of plugs 56, respectively, into abutting engagement with the opposite ends of the stop member 48. A locknut 64 is fitted over each adjusting bolt 60 to prevent its undesired loosening during operation of the shearing apparatus. Preferably, the stop member 48 should be connected to each plug 56 with a positioning pin 66 which is slidable endwise relative to either of the plug and the stop member.

The contact member 50 of the adjustable stop mechanism 46 is affixed to the slide 28 as by means of screws 68 and lock-pins 70 of suitable relative placement, as shown in a top plan view in FIG. 5. This contact member has a sloping surface 72 formed at its rear end projecting beyond the rear end of the slide 28. As indicated by the dot-and-dash lines in FIG. 4, the sloping rear surface of the contact member 50 is adapted to make abutting engagement with the sloping stop surface 54 of the stop member 48 at the end of the return stroke of the slide 28.

Thus, as the stop member 48 is moved endwise in either direction by turning the pair of adjusting bolts 60, the position where the rearward travel of the slide 28 is arrested by the stop mechanism 46 can be adjustably varied within limits. Such adjustment is required to situate the movable shear element 12 in the exact cutting position, indicated at P in FIG. 2, upon completion of the rearward stroke of the slide 28.

FIG. 2 further illustrates an air cylinder 74 which is screwed or otherwise rigidly connected to the rear end of the slide 28. The air cylinder 74 includes a piston 76 to which there is connected a piston rod 78 slidably extending through a bushing 80 that lines a hole formed in the slide. Projecting into the transverse opening 40 in the slide 28, the piston rod 78 terminates in a flange 82 for abutment against the rear face of the pusher member 42 rotatably mounted on the pin 38 at the top or free end of the actuator lever 32.

The air cylinder 74 has its head end chamber 84 communicated with a suitable source of pressurized air, not shown, via a conduit 86 extending through a clearance hole formed in a rear end plate 88 of the frame 20. The cylinder head end chamber 84 is to be maintained under constant supply of pressurized air during operation of the shearing apparatus.

The air pressure in the head end chamber 84 of the cylinder 74 is such that during the return stroke of the slide 28, its piston rod 78 is held extended in spite of the rearward force exerted thereon by the actuator lever 32 via the pusher member 42. After the rearward travel of the slide 28 has been arrested by the above described adjustable stop mechanism 46, the actuator lever 32 is pivoted further rearwardly, or counterclockwise as viewed in FIG. 2, thereby causing retraction of the piston rod 78 against the air pressure in the cylinder head end chamber 84. A space is therefore created between the pusher member 42 and the abutment 44 upon completion of each return stroke of the slide 28.

OPERATION

Although the operation of the shearing apparatus 10 is believed clearly apparent from the foregoing description, further amplification will be made in the following brief summary of such operation. While the movable shear element 12 is in the cutting position as shown in FIG. 1, the continuous wire stock W to be sheared and headed is fed through the fixed shear element 14 into abutting contact with the stop mechanism 16. The clamp mechanism 18 is then actuated for clamping against the movable shear element 12 the wire length projecting out of the fixed shear element 14.

Subsequently, the actuator lever 32 is pivoted clockwise, as viewed in FIG. 2, by the unshown cam mechanism for moving the slide 28 forwardly via the pusher member 42 in contact with the abutment 44. The wire length which has been projecting out of the fixed shear element 14 is cut off immediately as the movable shear element 12 on the slide 28 starts travelling from the cutting toward the transfer position together with the clamp mechanism 18. In the transfer position the wire length is unclamped and transferred to the first heading station.

The actuator lever 32 is then pivoted counter-clockwise for returning the movable shear element 12 from the transfer to the cutting position. During this return stroke of the movable shear element, the pusher member 42 pushes the slide 28 via the flanged piston rod 78 of the air cylinder 74 which is then held extended by virtue of the air pressure in its head end chamber 84.

After the rearward travel of the slide 28 has been arrested by the adjustable stop mechanism 46 in the cutting position of the movable shear element 12, the actuator lever 32 is pivoted counterclockwise through a certain additional angle, with the consequent retraction of the air cylinder piston rod 78 against the air pressure in its head end chamber 84. A space is thus created between pusher member 42 and abutment 44.

Therefore, after the next length of the continuous wire stock W has been fed out of the fixed shear element 14 and clamped against the movable shear element 12, the actuator lever 32 can be pivoted clockwise through the aforesaid additional angle without any load thereon while the pusher member 42 travels back into contact with the abutment 44. The actuator lever 32 is thus enabled to cause the movable shear element 12 to start travelling on its cutting stroke at such high speed that irregularity at the sheared ends of the wire lengths is minimized.

While the shearing apparatus in accordance with this invention has been shown and described in terms of its specific adaptation, it is understood that this is by way of example only, since numerous modifications or changes will occur to those skilled in the art. For example, the air cylinder 74 under constant supply of pressurized air may be replaced by springs or other equivalent means performing the same function as the cylinder. It is therefore to be understood that the appended claims are intended to cover all such modifications and changes as fall within the true spirit of the invention.

I claim:

1. In shearing apparatus having a movable and a fixed shear element, the combination thereof with:
   frame means including means forming a slideway;
   a slide slidably mounted in said frame means for reciprocating movement between a first and a second position along said slideway, said slide carrying said movable shear element for moving same with respect to said fixed shear element;
   actuator means for moving said slide between said first and said second positions;
   an abutment on said slide, said actuator means abutting on said abutment for exerting pressure therethrough on said slide while moving the latter from said first to said second position;
   stop means for terminating the travel of said slide in said first position as said slide is moved back from said second position by said actuator means; and
   resilient means through which said slide is moved from said second to said first position by said actuator means, said resilient means yielding, when said slide is moved to and stopped in said first position, to permit said actuator means to travel an additional distance in a direction away from said second position whereby a space is created between said actuator means and said abutment;
   whereby said actuator means is permitted to travel back unloaded through said space before moving said slide from said first to said second position.

2. The shearing apparatus as recited in claim 1, wherein said actuator means comprises:
   an actuator lever; and
   a pusher member operatively mounted on the free end of said actuator lever for pushing said slide via said abutment during movement of said slide from said first to said second position and for pushing said slide via said resilient means during movement of said slide from said second to said first position.

3. The shearing apparatus as recited in claim 1, wherein said stop means comprises:
   a stop member slidably supported by said frame means, said stop member having a sloping stop surface;
   contact means on said slide for engagement with said sloping stop surface when said slide is in said first position; and
   means for adjustably moving said stop member relative to said frame means and thus for permitting said contact means to engage said sloping stop surface in a selected position thereon;
   whereby said first position of said slide is adjustably variable with respect to said fixed shear element.

4. The shearing apparatus as recited in claim 1, wherein said resilient means is an air cylinder.

5. In apparatus for shearing work by clamping same against a movable shear element and moving the latter with respect to a fixed shear element, the combination thereof with:
   frame means adapted to provide a slideway;
   a slide slidable along said slideway between a first and a second position, said slide carrying said movable shear element for moving same with respect to said fixed shear element;
   an actuator lever for reciprocating said slide between said first and said second positions;
   said actuator lever having a pusher member operatively mounted on its free end;
   an abutment on said slide, said pusher member on said actuator lever pushing said slide via said abutment during movement of said slide from said first to said second position;
   stop means for terminating the travel of said slide in said first position as said slide is moved back from said second position; and resilient means through which said slide is pushed by said pusher member on said actuator lever while being moved from said second to said first position, said resilient means yielding, when said slide is moved to and stopped in said first position, to permit said actuator lever to pivot through an additional angle in such a direction that a space is created between said pusher member and said abutment;

whereby, before moving said slide from said first to said second position, said actuator lever can be pivoted unloaded through said additional angle in a direction opposite to the first mentioned direction while said pusher member is travelling through said space.

6. The shearing apparatus as recited in claim 5, wherein said resilient means is an air cylinder fixedly mounted on said slide and having a piston rod disposed for abutment on said pusher member so as to be pushed thereby in a retracting direction during movement of said slide from said second to said first position, said air cylinder including a head end chamber under constant supply of pressurized air.

* * * * *